US010831790B2

(12) United States Patent
Ammanamanchi et al.

(10) Patent No.: US 10,831,790 B2
(45) Date of Patent: Nov. 10, 2020

(54) LOCATION BASED DATA MINING COMPARATIVE ANALYSIS INDEX

(71) Applicant: INTERNATIONAL BUSINESS MACHINES CORPORATION, Armonk, NY (US)

(72) Inventors: Sasikanth B Ammanamanchi, Bangalore (IN); Sreekanth Iyer, Bangalore (IN); Manoj Palat, Bangalore (IN); Sulakshan Vajipayajula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 15/879,627

(22) Filed: Jan. 25, 2018

(65) Prior Publication Data

US 2019/0228088 A1    Jul. 25, 2019

(51) Int. Cl.
  *G06F 17/00* (2019.01)
  *G06F 16/29* (2019.01)
  *G06Q 30/02* (2012.01)
  *G06F 40/30* (2020.01)

(52) U.S. Cl.
  CPC .............. *G06F 16/29* (2019.01); *G06F 40/30* (2020.01); *G06Q 30/0205* (2013.01)

(58) Field of Classification Search
  None
  See application file for complete search history.

(56) References Cited

U.S. PATENT DOCUMENTS

| | | | |
|---|---|---|---|
| 8,751,490 B1 | 6/2014 | Cooley | |
| 8,918,312 B1* | 12/2014 | Rehling | G06F 40/30 704/9 |
| 9,330,174 B1* | 5/2016 | Zhang | G06F 16/95 |
| 2014/0358897 A1 | 12/2014 | Mishra et al. | |
| 2015/0356099 A1 | 12/2015 | Targonski et al. | |

OTHER PUBLICATIONS

Peter Mell et al, The NIST Definition of Cloud Computing, National Institute of Standards and Technology, Publication 800-145, 2011, entire document.
Omaima Almatrafi et al, Application of Location-Based Sentiment Analysis Using Twitter for Identifying Trends Towards Indian General Elections 2014, ACM, 2015, entire document.
Domenico Carlone, Sentiment Mining in a Location-Based Social Networking Space, Department of Software and Media Technology, Aalborg University Esbjerg, 2011, entire document.
global.com, The Association for Computational Linguistics, Location Based Social Media Monitoring Platform Features, Calendly, https://global.com, 2011, entire document.
Raymond Camden, Performing sentiment analysis of Twitter data, https://www.raymondcamden.com, 2016, entire document.
Norjihan Abd Ghani et al, A Sentiment-Based Filteration and Data Analysis Framework for Social Media, Prtoceedings of the 5th International Conference on Computing and Informatics, ICOCI, 2015, entire document.

* cited by examiner

*Primary Examiner* — Anhtai V Tran
(74) *Attorney, Agent, or Firm* — Patrick J. Daugherty; Daugherty & Del Zoppo Co., LPA (57) ABSTRACT

Aspects of the present invention provide devices that index geographic locations with comparative indicators that are determined from a sentiment analysis of opinion data, wherein the comparative indicators may include sums of different indices that are each determined from sentiment analysis of opinion data.

12 Claims, 7 Drawing Sheets

LOCATION BASED DATA MINING COMPARATIVE ANALYSIS INDEX

BACKGROUND

Data mining can be used for analysis of data to determine sentiments or opinions. Such analysis is a type of natural language processing that can track a mood, sentiment, or public opinions about a particular product or topic, such as an election issue.

In one example, prospective home buyers will often use Internet search query results to learn about prospective cities under consideration for a home purchase. Travelers likewise also rely on Internet search query results to learn about prospective travel locations.

BRIEF SUMMARY

In one aspect of the present invention, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby index locations with a comparative indicator, which computes a comparative indicator for a plurality of geographic locations. The comparative indicator comprises a sum of a plurality of indices, and each index is computed from a sentiment analysis of opinion data. The comparative indicator for each of the plurality of geographic locations is returned to a local computing device.

In another aspect, a computer program product for indexing locations with a comparative indicator has a computer-readable storage medium with computer readable program code embodied therewith. The computer readable hardware medium is not a transitory signal per se. The computer readable program code includes instructions for execution by a processor that cause the processor to guide vehicle evaluation, which computes a comparative indicator for a plurality of geographic locations. The comparative indicator comprises a sum of a plurality of indices, and each index is computed from a sentiment analysis of opinion data. The comparative indicator for each of the plurality of geographic locations is returned to a local computing device.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
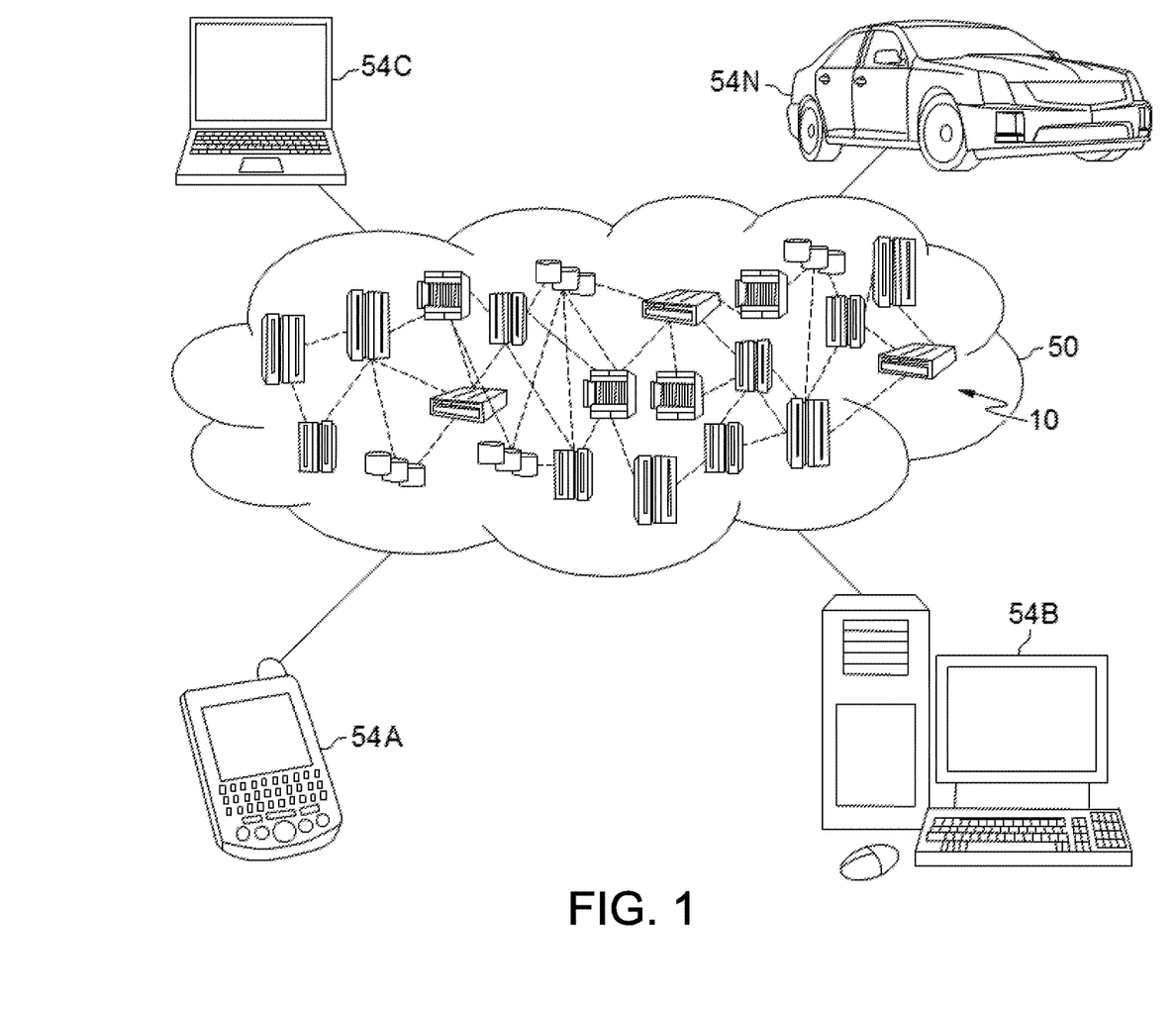
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
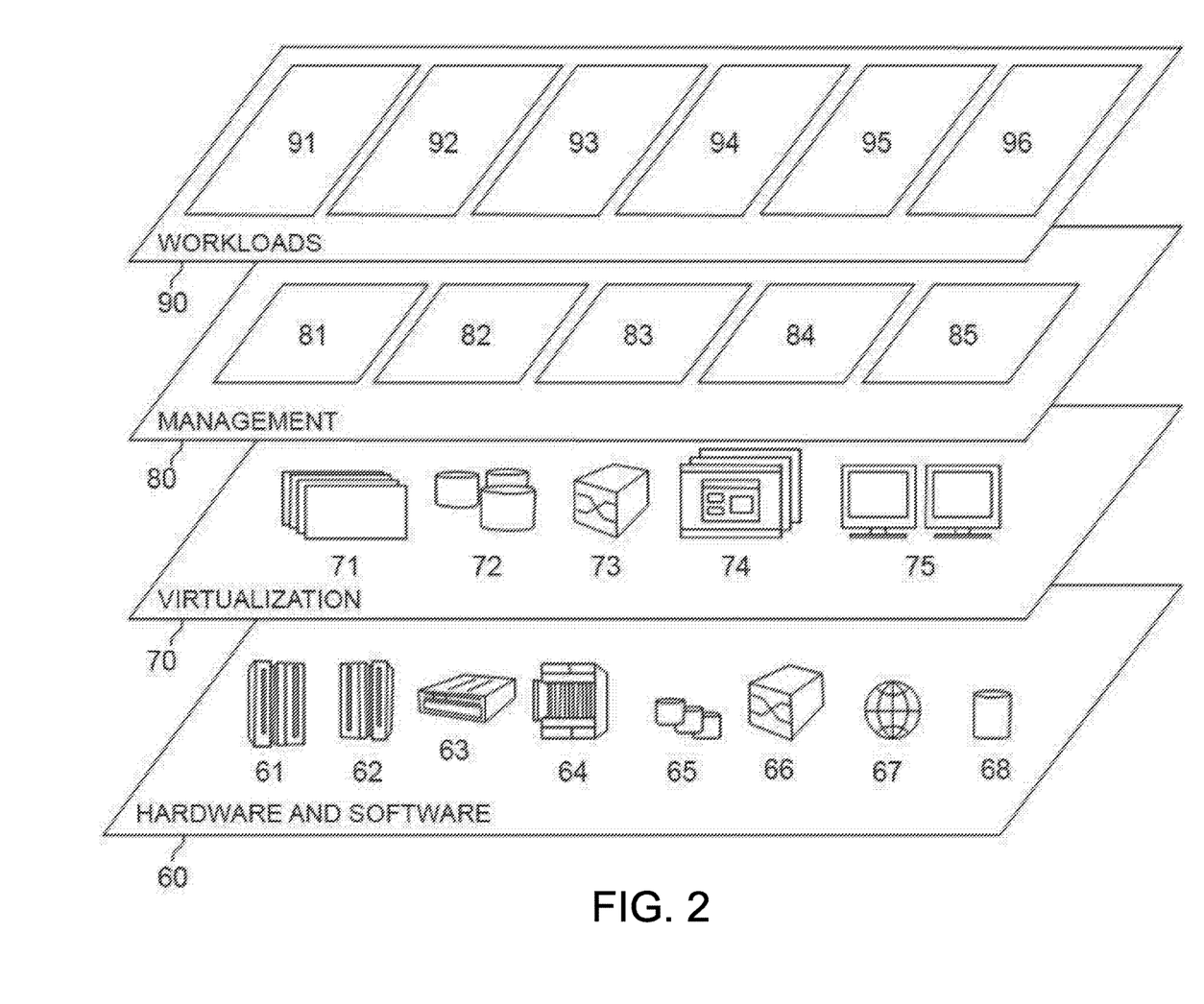
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for indexing locations with a comparative indicator 96.

Figure 3:
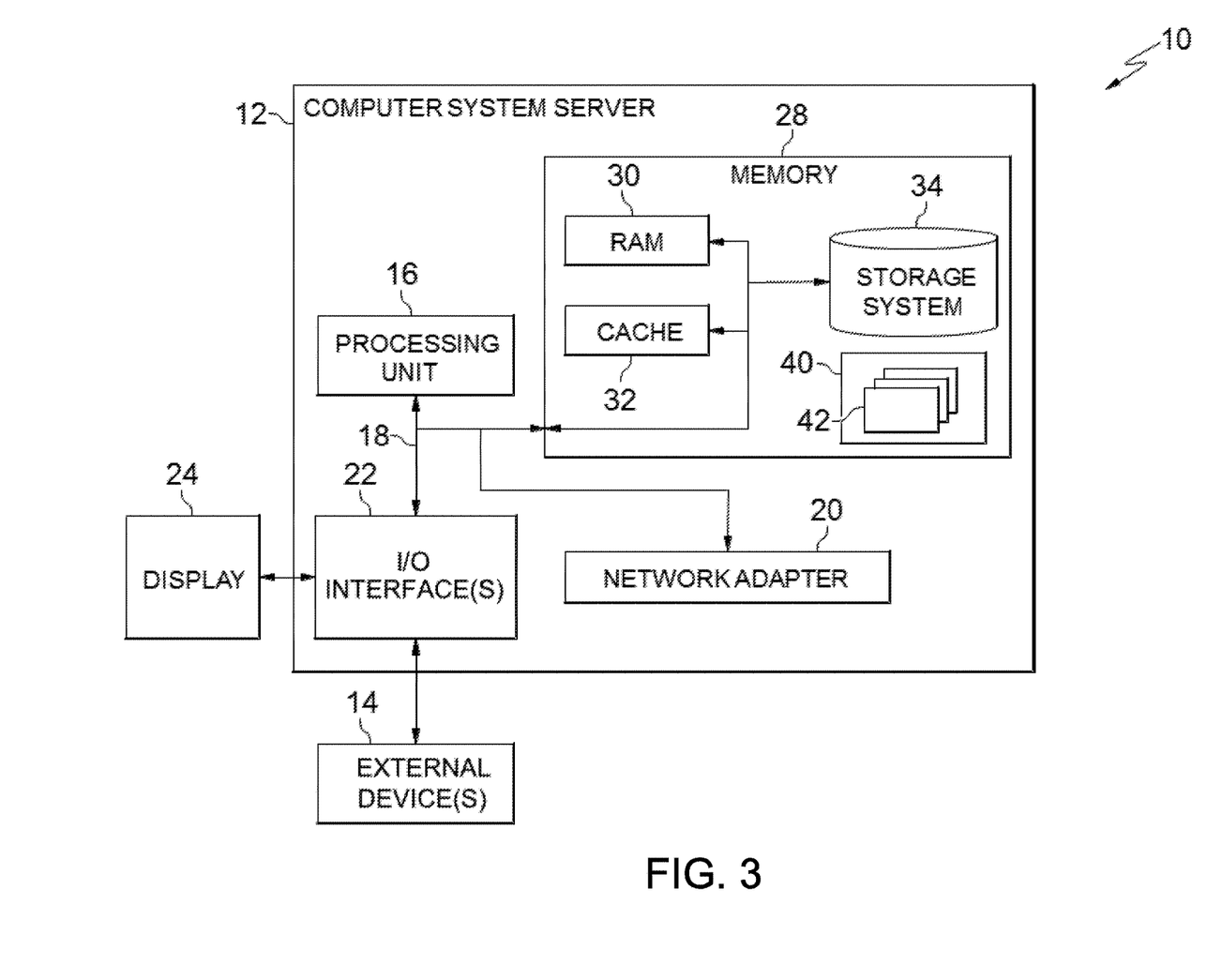
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
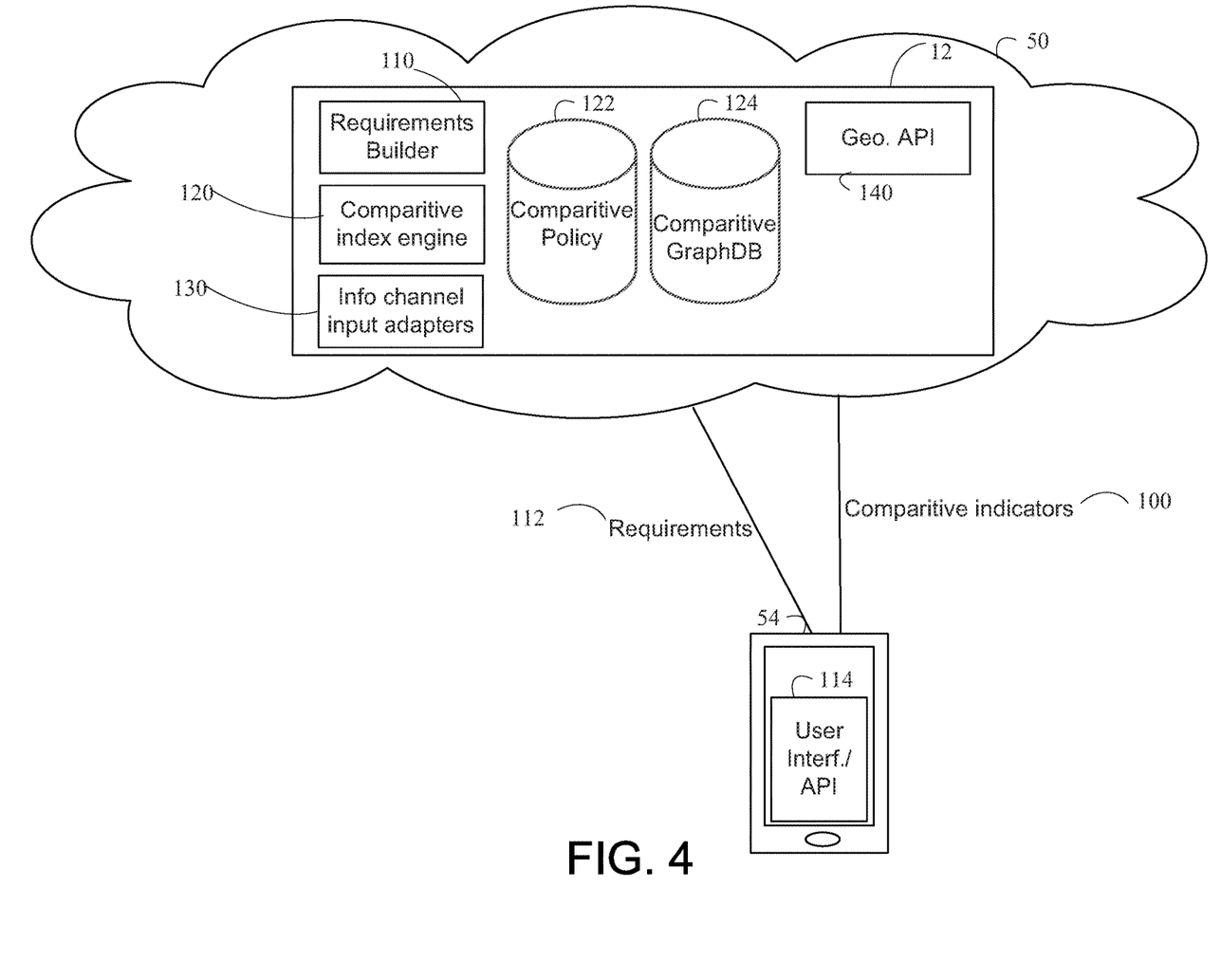
FIG. 4 depicts a schematic illustration of system aspects according to an embodiment of the present invention.

FIG. 4 illustrates schematically a system according to the present invention for indexing locations using a comparative indicator 100. A requirements builder 110 receives requirements 112 from a user interface or application programming interface (API) 114 of the local computing device 54. The requirements 112 can be expressed as free text. For example, the user requirements 112 can include entry of the following text for a prospective home buyer includes: I think that I need a home in a peaceful locality, within a 5 km radius of the BIG CO. office at Intermediate Ring Road, Bangalore. The home should have easy access to great schools for my little children. I love a neighborhood where there is an environment of art and culture. I would like to have my parents who stay with me to have a community retired life. I don't care much about short term return on investment as I plan to stay there.

In some embodiments, the requirements 112 are expressed as free text statements in response to questions. For example, based on a questions for an empathy map, the questions about a prospective location can include "what do you want think and feel about a prospective location," "what you want to hear about a prospective location," "what do you want to see about a prospective location," "what you want to say and do about a prospective location," "what do you see as pain about a prospective location," and "what do see as gain for a prospective location." In some embodiments, the requirements 112 are received according to checked boxes. In some embodiments, the requirements 112 are received according to a ranked list of statements. Combinations of the above are contemplated. In some embodiments, the requirements 112 include a current location or a reference location. The current location or reference location can be received based on global positioning satellite (GPS) information according to the local computing device, user preferences stored on the phone, profile information, and the like.

The requirements builder 110 parses the requirements into sentences and/or sentence fragments pertaining to preferences for each index, and into statements or fragments pertaining to locations. For example, from the requirements stated above, "within a 5 km radius to BIG CO. office at Intermediate Ring Road, Bangalore" and "neighborhood" are extracted, which indicate locations. The requirements builder 110 is suitably embodied by one or more configured processors, such as the processor 16 of FIG. 3, a processor of the local computing device 54 and combinations thereof, and configured to receive and parse the requirements.

A comparative index engine 120 computes the comparative indicator 100 as a composite index of a plurality of sentiment analysis indices for a plurality of the geographic locations. Each comparative indicator 100 includes a value computed from a plurality of indices of different opinions for a location. The opinions about a location can include opinions about topics, such as weather, traffic, politics, facilities, essential services, events and news. The locations can be expressed at different geographical levels. For example, the locations can be fine grained, such as a neighborhood, or city block level. The locations can be identified at a coarser level, such as a town, city, state, province, regions and combinations thereof. The locations can be political geographic divisions, environmental geographic divisions, and combinations thereof. For example, a location can comprise a collection of politically distinct cities in a coastal region. The indices can be weighted. The comparative indicator 100 for a location, A, can be expressed formally as the following Expression (1):

$$f(A)=\Sum_{i=1}^{m}\alpha_i \text{index}_i, \quad (1)$$

where $\alpha_i$ is a weight for the ith index. In some embodiments, the indices include a weather index, a political index, a facilities index, an essential services index, an events index, and a news index. In some embodiments, the comparative indicator 100 is normalized to a range of values, such as integers in the range of 1-100. In some embodiments, each index for a location is based on a result of sentiment analysis of that location.

The weather index includes weather and climatic conditions for the location. The traffic index includes traffic and transportation within, ingress and egress for the location. The political index includes political issues and views of those within the location, as well as local issues. The events index includes events within the location. The facilities index includes both public and private structures and organizations located within or active in the location, such as schools, retail outlets, and hospitals. The essential services index includes public and private utilities, such was power, water, data and voice communications for both business and/or residences. The news index includes articles and programs related to the location, such as Internet articles, social media content, radio broadcast, and television broadcast.

Each index of the comparative indicator 100 for each location is analyzed using sentiment analysis. The scope of opinions used in the sentiment analysis can be general, restricted by source, restricted by locality, restricted to one or more specific opinions according to a policy, restricted by the received requirements, and combinations thereof. For example, the weather index can be based on opinions from a plurality of sources unrestricted, such as an opinion of the weather of a location A. Alternatively, the weather index can be based on opinions of sources that are identified as persons from location A. Alternatively, the opinions can be based on specific opinions of temperatures of location A. Alternatively, the opinions can be based on a requirements statement of "I like sunny weather."

In some embodiments, one or more indices of the plurality of indices include a composite index of a plurality of sentiment analysis. For example, "I like sunny weather, but I also like to ski" can be treated as a composite index, which includes a combination of a first index indicating sunny weather and a second index indicating weather for skiing, such as opinions of quantity of snowfall precipitation, and opinions of quality of snowfall for skiing. In some embodiments, a scope of opinions can be further limited by time, such as a range of or specific days, weeks, or months.

The selection of scope for each index of the comparative indicator 100 is according to a comparative policy database 122. The comparative policy database 122 includes sets of rules for selecting the opinions and the sources of used in the sentiment analysis. The rules select the sources, the types of opinions, the time frames for consideration (hourly, daily, weekly, monthly, annually) and combinations thereof according to policy. The rule can alter the weights of the indices that comprise the comparative indicator 100 for a location.

The comparative index engine 120 uses information channel adapters 130 to access various sources of data, such as through APIs for social media, local radio broadcasts, local television broadcasts, other Internet sources and combinations thereof. For example, APIs for Twitter®, Facebook®, and LinkedIn® can provide access to opinions or statements, which can be used for sentiment analysis. (TWITTER is a trademark of Twitter Inc. in the United States or other countries; FACEBOOK is a trademark of Facebook Inc. in the United States or other countries; LINKEDIN is a trademark of LinkedIn Corporation in the United States or other countries.) APIs can include geographic restrictions and/or provide geographic locations with the opinion data, which can be used by the rules of the comparative policy database 122 to limit the scope of the sources.

The comparative index engine 120 uses a comparative graph database 124 to relate specific requirements to opinions, to generalize requirements or opinions, to narrow requirements or opinions, to relate different levels of locations, and combinations thereof. The comparative graph database 124 included weighted graphs with nodes and edges that can be semantically queried. For example, the requirement for "parents to have a community life" can be related to and/or broaden by the graph to opinions of senior citizens clubs, open parks, and philosophical events. Opinions can include opinions about quantity and quality of senior citizens clubs. In another example, neighborhood locations can be related or broaden to larger political or environmental geographical area locations.

The comparative index engine 120 returns the comparative indicators 100 and their corresponding geographic locations to the local computing device 54 via the user interface or API 114. The returned comparative indicators can be returned to the local computing device 54 over the network. The locations corresponding to the returned comparative indicators can be according to a geographic map display or according to an API or a geographic display 130. The returned comparative indicators 100 are displayed with the geographic display on a display device of the local computing device 54.

The comparative index engine 120 is suitably embodied by one or more configured processors in the cloud environment 10, such as the processor 16 of FIG. 3 of the computer system/server 12, and configured to compute the comparative indicators 100 for a plurality of locations according to the comparative policy database 130.

Figure 5:
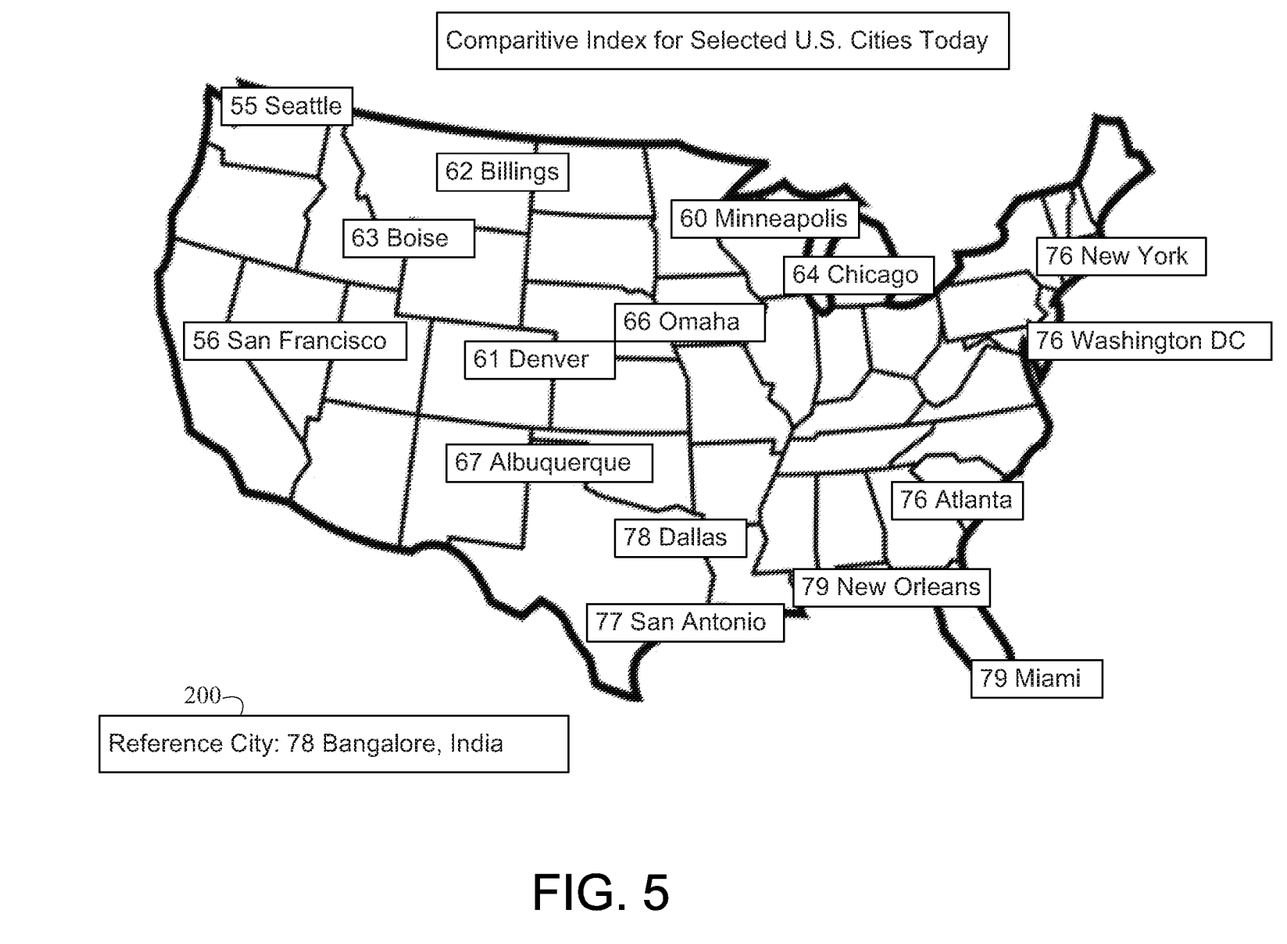
FIG. 5 depicts an example display according to an embodiment of the present invention.

FIG. 5 depicts an example display of the comparative indicators 100 on a geographic map. The comparative indicators are spatially shown on an illustrated U.S. domestic map related to city locations of the map obtained from the geographic database or API 140. The city locations of the map correspond to the displayed comparative indicator values. For example, the city of Chicago has a comparative indicator value of 64, while the city of Seattle has a comparative indicator value of 55.

In some embodiments, the user interface 114 can operate interactively to revise the requirements 112. For example, selecting the comparative indicator values for a city can send a revision of the requirements 112 for a next geographic level of sub-divisions of the city, which effectively provides a drill down effect. That is, selecting the city, changes the comparative indicators 100 from the city level to a finer grain geographic level, such as neighborhoods or blocks within the city.

In some embodiments, the reference location 200 is also displayed with the geographic display, and can be spatially provided separately from the geographic map. For example, a reference city of Bangalore India can be included with a displayed comparative indicator value with the comparative indicators values of other cities as illustrated on the domestic U.S. map. The requirements can also be interactively revised, such as adding additional requirements, re-ranking statements, checking and un-checking boxes, and combinations thereof.

In some instances, the comparative indicators 100 displayed for geographic locations provide a broader view of opinions about a location that conventional sentiment analysis of a particular issue or product.

Figure 6:
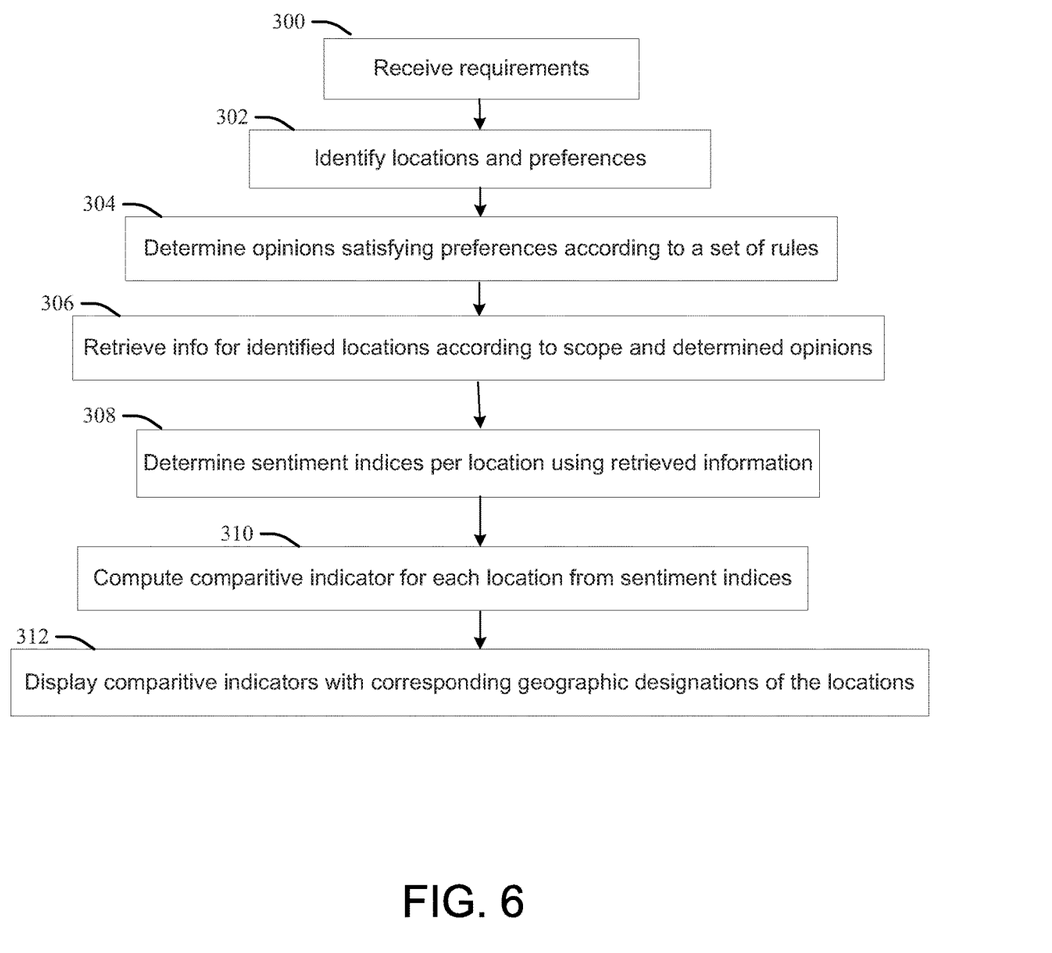
FIG. 6 is a flow chart illustration of an embodiment of the present invention.

FIG. 6 illustrates one embodiment of a method according to the present invention for indexing locations with the comparative indicator 100. At 300, a processor that is configured according to an aspect of the present invention (the "configured processor") receives the requirements 112 from the local computing device 54. The requirements 112 can be received via electronic communication from the local computing device at 54, such as one of the cloud computing nodes 10. The configured processor may be implemented in accordance with the computer system server 12 of FIG. 3, including as the cloud node 10 of FIG. 1, as described respectively above.

At 302, the configured processor identifies locations and preferences from the received requirements 112. The identification can include parsing natural language statements from the received requirements 112, which identify locations and preferences for the comparative indicator 100. The locations can include specific target locations for values of the comparative indicator 100. The identified locations can include a geographic region, such as India or North America, and can indicate a geographic level within the geographic region, such as cities.

At 304, the configured processor can determine the scope of the data sources include geographic inclusion or exclusion, the type of opinions, and the time period according to the rules from the comparative policy database 122 and the relationships from the comparative graph database 124.

At 306, the configured processor retrieves the opinion data from the information channel adapters 130 according to the determined scope.

At 308, the configured processor computes the plurality of sentiment indices for each location according to the determined scope and the retrieved data.

At 310, the configured processor computes the comparative indicator 100 for each location from the computed sentiment indices. In some embodiments, each of the plurality of sentiment indices are weighted according to the comparative policy database 122. In some embodiments, the comparative policy database 122 includes rules, which modify the weights according to the received requirements 112.

At 312, the configured processor displays the computed comparative indicators 100 for the plurality of locations on the display of the local computing device 54. The display can include a geographic display, which spatially locates the comparative indicators 100 according to corresponding geographical locations of the map, such as illustrated in FIG. 5. In some embodiments, the comparative indicators 100 can be displayed on the display of the local computing device 54 in a list format with corresponding geographical locations label for each comparative indicator value. In some embodiments, the indices comprising the comparative indicator values can be displayed. In some embodiments, the weight of each index is displayed.

Figure 7:
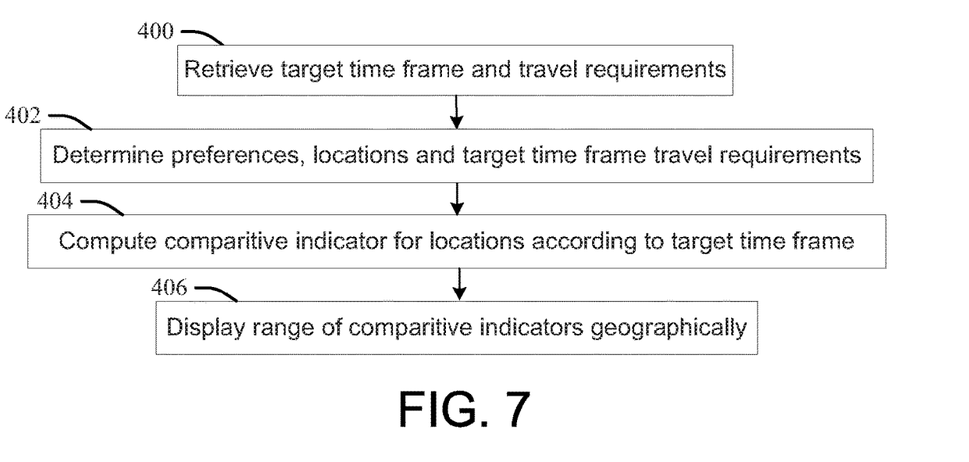
FIG. 7 is a flow chart illustration of another embodiment of the present invention.

FIG. 7 another embodiment of a method according to the present invention for indexing locations with the comparative indicator 100. At 400, the configured processor receives the requirements 112, which include target travel locations and a target time frame for travel.

At 402, the configured processor determines travel preferences and the target time frame, such as particular day(s), week(s), or month(s). That is, a target time frame can include the month of February, which is in the future.

At 404, the configured processor computes the comparative indicator 100 for each target travel location according to the target time frame. In some embodiments, the comparative indicator 100 adjusts weights of the indices, such as those related transportation, events and entertainment facilities according to opinions of travelers. That is, in some instances the rules of the comparative policy database 122 adjust the weights of the indices for those of traveler, and the scope of the sources can exclude opinions of residents and commuters. In some embodiments, the comparative indicator 100 includes a plurality of values for each location separated by time frame within the target time frame, such as by day, by week, or by month. For example, the target time frame includes the months of February and March. Values of the comparative indicator 100 are computed separately for the month of February and the month of March according to the comparative policy database 122. The scope of the sources according to the comparative policy rules can include traveler opinions computed for same months of prior years.

At 406, the configured processor the configured processor displays the computed comparative indicators 100 for the plurality of locations on the display of the local computing device 54. In some embodiments, the comparative indicators 100 for each of the plurality of locations are indicated as a range of values over the target time frame. In some embodiments, the iterative revision of the requirements 112 can include a calendar display or time subdivision, which illustrates the comparative indicator values of the same location, rather than a geographic subdivision of the location.

Figure 8:
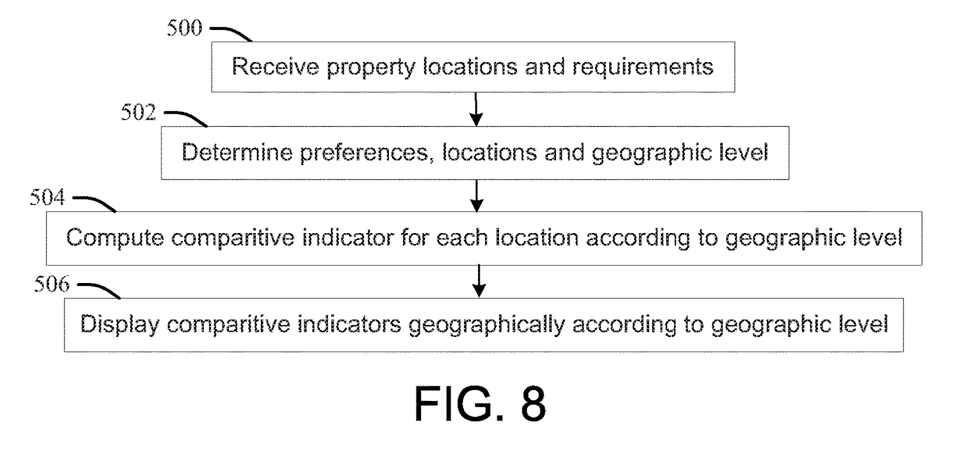
FIG. 8 is a flow chart illustration of another embodiment of the present invention.

FIG. 8 another embodiment of a method according to the present invention for indexing locations with the comparative indicator 100. At 500, the configured processor receives the requirements 112, which include a set of target locations, such as owned properties, and a geographic level. In some embodiments, the geographic level can include a distance measure, such as a radius around the set of target locations for inclusion in the scope.

At 502, the configured processor determines preferences, the locations from the set of target locations, and the scope according to the geographic level. In some instances, the geographic level can be represented as a scope of meaningful opinions regarding the properties.

At 504, the configured processor computes the comparative indicator 100 for each location according to the geographic level. In some embodiments, the computed comparative indicator 100 for each location includes a plurality of values according to variations of the geographical level, such as multiples of the radius, a next higher or a next lower geographic level.

At 506, the configured processor the configured processor displays the computed comparative indicators 100 for the plurality of locations on the display of the local computing device 54. In some embodiments, the comparative indicators 100 for each of the plurality of locations are indicated as a range of values over the geographic level.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor;
a computer readable memory in circuit communication with the processor; and
a computer readable storage medium in circuit communication with the processor;
wherein the processor executes program instructions stored on the computer-readable storage medium via the computer readable memory:
receives requirements for a comparative indicator from a local computing device in circuit communication with the processor, wherein the requirements are expressed as natural language statements;
identifies preferences for each of a plurality of geographic locations as a function of the received requirements;
computes values for the comparative indicator for each of the plurality of geographic locations as functions of respective ones of the identified preferences and respective sums of values of a plurality of indices that are associated to each of the plurality of geographic locations, each index computed from a sentiment analysis of opinion data, and wherein the indices are selected from the group consisting of a weather index, a traffic index, a political index, a facilities index, an essential services index, an events index, and a news index;
returns the comparative indicators computed for each of the plurality of geographic locations to the local computing device;
drives a display device of the local computing device to display, within a graphical user interface window, the returned comparative indicators for each of the plurality of geographic locations within a geographic map, each of the returned comparative indicators spatially located with a corresponding geographic location on the geographic map;
in response to a user selection via a graphical user interface input of a first of the returned comparative indicators displayed within the geographic map for a first of the geographic locations, revises the requirements for the comparative indicator for a sub-division level of the first geographic location, and computes and returns to the local device a revised value for the first comparative indicator as a function of the revised requirements for the sub-division level of the first geographic location.

2. The system of claim 1, wherein the weather index is computed as a function of weather and climatic condition opinion data for the geographic locations;
the traffic index is computed as a function of traffic and transportation opinion data for the geographic locations;
the political index is computed as a function of political issue view data for the geographic locations;
the facilities index is computed as a function of opinion data associated to structures and organizations located or active within the geographic locations;
the essential services index is computed as a function of opinion data associated to utility service within the geographic locations;
the events index is computed as a function of opinion data associated to events occurring within the geographic locations, and
the news index is computed as a function of opinion data within media content related to the geographic locations.

3. The system of claim 2, wherein the processor executes program instructions stored on the computer-readable storage medium via the computer readable memory and thereby:
receives the requirements for the comparative indicator from the local computing device expressed as natural language text statements data; and
identifies the preferences and the plurality of locations from the received requirements for the comparative indicator.

4. The system of claim 3, wherein the processor executes program instructions stored on the computer-readable storage medium via the computer readable memory and thereby identifies the sub-division level of the first geographic location from the received requirements for the comparative indicator;
wherein the sub-division level is selected from the group comprised of: a radial distance around each of the plurality of locations, a neighborhood, a town, a city, a state, and a province; and
wherein a scope of each sentiment analysis limits the opinion data to the geographic level.

5. The system of claim 3, wherein the preferences include a target time frame for travel, and wherein the processor executes program instructions stored on the computer-readable storage medium via the computer readable memory and thereby identifies the target time frame for travel from the received requirements for the comparative indicator; and
wherein a scope of each sentiment analysis limits the opinion data to times that correspond the target time frame.

6. The system of claim 5, wherein the processor executes program instructions stored on the computer-readable storage medium via the computer readable memory and thereby:
determine weights for each of the plurality of indices according to a set of rules, and the sum of the plurality of indices includes a weighted sum of the plurality of indices according to the determined weights.

7. A computer program product, comprising:
a computer readable storage medium having computer readable program code embodied therewith, wherein the computer readable storage medium is not a transitory signal per se, the computer readable program code comprising instructions for execution by a processor that cause the processor to:
receive requirements for a comparative indicator from a local computing device in circuit communication with the processor, wherein the requirements are expressed as natural language statements;
identify preferences for each of a plurality of geographic locations as a function of the received requirements;
compute values for the comparative indicator for each of the plurality of geographic locations as functions of respective ones of the identified preferences and respective sums of values of a plurality of indices that are associated to each of the plurality of geographic locations, each index computed from a sentiment analysis of opinion data, and wherein the indices are selected from the group consisting of a weather index, a traffic index, a political index, a facilities index, an essential services index, an events index, and a news index; and
return the comparative indicators computed for each of the plurality of geographic locations to the local computing device;
drive a display device of the local computing device to display, within a graphical user interface window, the returned comparative indicators for each of the plurality of geographic locations within a geographic map, each of the returned comparative indicators spatially located with a corresponding geographic location on the geographic map;
in response to a user selection via a graphical user interface input of a first of the returned comparative indicators displayed within the geographic map for a first of the geographic locations, revise the requirements for the comparative indicator for a sub-division level of the first geographic location, and compute and return to the local device a revised value for the first comparative indicator as a function of the revised requirements for the sub-division level of the first geographic location.

8. The computer program product of claim 7, wherein the weather index is computed as a function of weather and climatic condition opinion data for the geographic locations;

the traffic index is computed as a function of traffic and transportation opinion data for the geographic locations;
the political index is computed as a function of political issue view data for the geographic locations;
the facilities index is computed as a function of opinion data associated to structures and organizations located or active within the geographic locations;
the essential services index is computed as a function of opinion data associated to utility service within the geographic locations;
the events index is computed as a function of opinion data associated to events occurring within the geographic locations, and
the news index is computed as a function of opinion data within media content related to the geographic locations.

9. The computer program product of claim 7, wherein the instructions for execution cause the processor to:
receive the requirements for the comparative indicator from the local computing device expressed as natural language text statements data; and
identify the preferences and the plurality of locations from the received requirements for the comparative indicator.

10. The computer program product of claim 9, wherein the instructions for execution cause the processor to identify the sub-division level of the first geographic location from the received requirements for the comparative indicator;
wherein the sub-division level is selected from the group comprised of: a radial distance around each of the plurality of locations, a neighborhood, a town, a city, a state, and a province; and
wherein a scope of each sentiment analysis limits the opinion data to the geographic level.

11. The computer program product of claim 9, wherein the preferences include a target time frame for travel, and wherein the instructions for execution cause the processor to identify the target time frame for travel from the received requirements for the comparative indicator; and
wherein a scope of each sentiment analysis limits the opinion data to times that correspond the target time frame.

12. The computer program product of claim 10, wherein the instructions for execution cause the processor to:
determine a plurality of opinions which satisfy at least one of the preferences with a set of rules stored in a comparative policy database, wherein the plurality of opinions are used to compute at least one of the plurality of indices.

* * * * *